(12) United States Patent
Kimura et al.

(10) Patent No.: US 8,847,744 B2
(45) Date of Patent: Sep. 30, 2014

(54) VEHICLE RECEIVER SYSTEM, VEHICLE RECEIVER, AND OPERATING METHOD FOR VEHICLE RECEIVER

(75) Inventors: Arinobu Kimura, Toyota (JP); Hiroki Okada, Toyota (JP); Hiroko Murakami, Toyota (JP); Noriaki Okada, Chiryu (JP); Kazuhiro Nakashima, Anjo (JP)

(73) Assignees: Toyota Jidosha Kabushki Kaisha, Toyota-shi (JP); Denso Corporation, Kariya (JP)

( * ) Notice: Subject to any disclaimer, the term of this patent is extended or adjusted under 35 U.S.C. 154(b) by 153 days.

(21) Appl. No.: 13/549,796

(22) Filed: Jul. 16, 2012

(65) Prior Publication Data
US 2013/0181824 A1   Jul. 18, 2013

(30) Foreign Application Priority Data

Jul. 19, 2011   (JP) ................. 2011-158190

(51) Int. Cl.
*B60Q 1/00* (2006.01)
*B60C 23/04* (2006.01)
*B60C 23/20* (2006.01)
*G07C 9/00* (2006.01)

(52) U.S. Cl.
CPC ...... *B60C 23/20* (2013.01); *G07C 2009/00793* (2013.01); *B60C 23/0435* (2013.01); *B60C 23/0418* (2013.01); *G07C 2209/63* (2013.01); *G07C 9/00182* (2013.01)
USPC ..................... 340/438; 340/426.35

(58) Field of Classification Search
CPC ........ B60R 25/20; B60R 25/24; B60C 23/20; B60C 23/00; G07C 9/00182; G07C 9/000309
USPC ........ 340/426.35, 426.36, 442, 438; 73/146.4
See application file for complete search history.

(56) References Cited

U.S. PATENT DOCUMENTS

| | | | |
|---|---|---|---|
| 5,463,374 A * | 10/1995 | Mendez et al. | 340/442 |
| 6,650,236 B2 * | 11/2003 | Ghabra et al. | 340/447 |
| 7,026,953 B2 * | 4/2006 | Fujii | 340/870.16 |
| 7,119,661 B2 * | 10/2006 | Desai et al. | 340/5.61 |
| 7,474,195 B2 * | 1/2009 | Farrell | 340/5.72 |
| 7,623,021 B2 * | 11/2009 | Desai et al. | 340/5.61 |

(Continued)

FOREIGN PATENT DOCUMENTS

| | | |
|---|---|---|
| JP | 2005-236556 | 9/2005 |
| JP | 2006-151003 A | 6/2006 |
| JP | 2007-28276 | 2/2007 |

*Primary Examiner* — Eric M Blount
(74) *Attorney, Agent, or Firm* — Oblon, Spivak, McClelland, Maier & Neustadt, L.L.P.

(57) ABSTRACT

A vehicle receiver system includes: a receiver provided in a vehicle cabin, wherein an operating mode of the receiver includes a first mode for receiving a first wireless signal transmitted from a portable key, and a second mode for receiving a second wireless signal relating to a tire air pressure, transmitted from a transmitter provided on a tire; and a key verification device that performs key verification on the portable key in the vehicle cabin on the basis of the first wireless signal. In a predetermined situation, the receiver is configured such that the operating mode of the receiver is switched between the first mode and the second mode, and proportion of a second mode operation time in which the receiver operates in the second mode is set to be greater when a vehicle speed is relatively high than when the vehicle speed is relatively low.

10 Claims, 3 Drawing Sheets

(56) References Cited

U.S. PATENT DOCUMENTS

| | | | |
|---|---|---|---|
| 8,031,048 B2* | 10/2011 | Hata | 340/5.72 |
| 8,284,020 B2* | 10/2012 | Ghabra et al. | 340/5.61 |
| 2003/0046993 A1* | 3/2003 | Fujii | 73/146.5 |
| 2003/0117295 A1* | 6/2003 | Okada | 340/825.72 |
| 2005/0083175 A1* | 4/2005 | Yanagimoto | 340/5.72 |
| 2005/0191966 A1* | 9/2005 | Katsuta | 455/68 |
| 2007/0164876 A1* | 7/2007 | Ostrander et al. | 340/825.72 |
| 2010/0271171 A1* | 10/2010 | Sampei | 340/5.6 |

* cited by examiner

VEHICLE RECEIVER SYSTEM, VEHICLE RECEIVER, AND OPERATING METHOD FOR VEHICLE RECEIVER

INCORPORATION BY REFERENCE

The disclosure of Japanese Patent Application No. 2011-158190, filed on Jul. 19, 2011 including the specification, drawings and abstract, is incorporated herein by reference in its entirety.

BACKGROUND OF THE INVENTION

1. Field of the Invention

The invention relates to a vehicle receiver system that includes a receiver provided in a vehicle cabin, an operating mode of the receiver including a first mode in which processing is performed to receive a first wireless signal for verification, transmitted from a portable key, and a second mode in which processing is performed to receive a second wireless signal relating to a tire air pressure, transmitted from a transmitter provided on a tire. The invention also relate to the receiver and an operating method for the receiver.

2. Description of Related Art

This type of vehicle receiver system is available in the related art (see Japanese Patent Application Publication No. 2007-028276 (JP 2007-028276 A), for example). The vehicle receiver system is basically capable of receiving a signal relating to the tire air pressure from a sensor transmitter when an ignition key is inserted into a key cylinder or an ignition switch is turned ON. Further, when smart communication is performed in a condition where the signal relating to the tire air pressure is receivable, a signal transmitted by a portable key is input into the vehicle receiver system preferentially over the signal relating to the tire air pressure.

However, in a situation where continuous key verification is required, such as a situation where the likelihood of the portable key having been taken out of the vehicle is high, for example, the receiver is operated in a first mode (a mode in which processing is performed to receive a first wireless signal for key verification), and thus the time in which the receiver operates in a second mode (a mode in which processing is performed to receive a second wireless signal relating to the tire air pressure) decreases correspondingly. As a result, a tire air pressure monitoring capability may deteriorate.

SUMMARY OF THE INVENTION

The invention provides a vehicle receiver system in which an operating mode of a receiver can be switched appropriately between a first mode and a second mode in a situation where continuous key verification is required.

A first aspect of the invention is a vehicle receiver system including: a receiver that is provided in a vehicle cabin, wherein an operating mode of the receiver includes a first mode in which processing is performed to receive a first wireless signal for key verification, transmitted from a portable key, and a second mode in which processing is performed to receive a second wireless signal relating to a tire air pressure, transmitted from a transmitter provided on a tire; and a key verification device that performs a key verification on the portable key in the vehicle cabin on the basis of the first wireless signal received by the receiver, wherein: in a predetermined situation where the key verification device performs key verification continuously, the receiver is configured such that the operating mode of the receiver is switched between the first mode and the second mode; and in the predetermined situation, a proportion of a second mode operation time in which the receiver operates in the second mode is set to be greater when a vehicle speed is relatively high than when the vehicle speed is relatively low.

A second aspect of the invention is a vehicle receiver provided in a vehicle cabin including: a receiving unit of which operating mode includes a first mode in which processing is performed to receive a first wireless signal for key verification, transmitted from a portable key, and a second mode in which processing is performed to receive a second wireless signal relating to a tire air pressure, transmitted from a transmitter provided on a tire; and a switching control unit that switches the operating mode of the receiving unit between the first mode and the second mode in a predetermined situation where key verification on the basis of the first wireless signal is performed continuously, wherein, in the predetermined situation, a proportion of a second mode operation time in which the receiving unit operates in the second mode is set to be greater when a vehicle speed is relatively high than when the vehicle speed is relatively low.

A third aspect of the invention is an operating method for a vehicle receiver provided in a vehicle cabin including: when the receiver is operated in a first mode, performing processing to receive a first wireless signal for key verification, transmitted from a portable key; when the receiver is operated in a second mode, performing processing to receive a second wireless signal relating to a tire air pressure, transmitted from a transmitter provided on a tire; and in a predetermined situation, switching an operating mode of the receiver between the first mode and the second mode, wherein, in the predetermined situation where key verification on the basis of the first wireless signal is performed continuously, a proportion of a second mode operation time in which the receiver operates in the second mode is set to be greater when a vehicle speed is relatively high than when the vehicle speed is relatively low.

With the configurations described above, a vehicle receiver system in which the operating mode of the receiver can be switched appropriately between the first mode and the second mode in a situation wherein continuous key verification is required.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of the invention will be described below with reference to the drawings.

Figure 1:
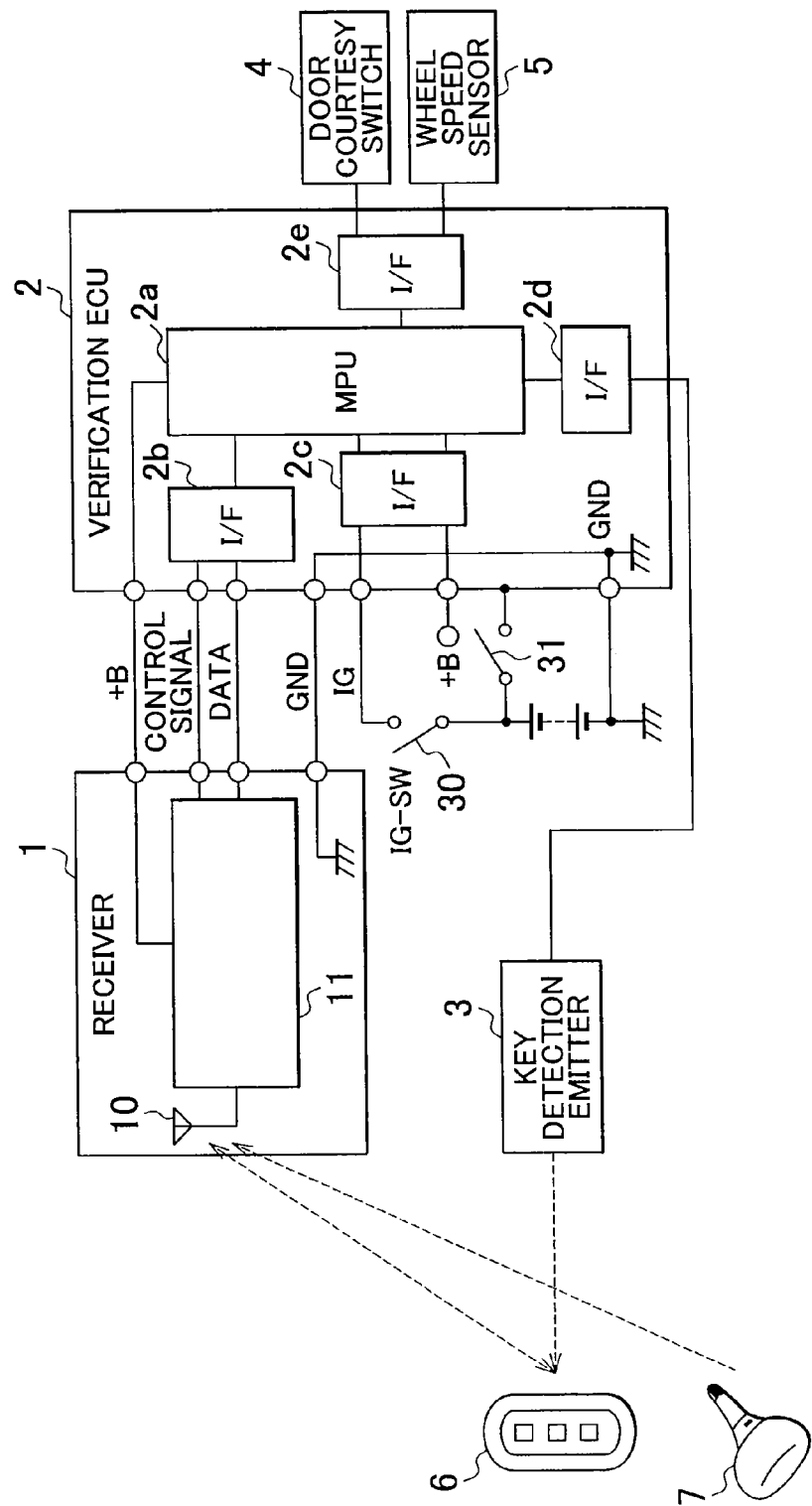
FIG. 1 is a block diagram showing the main parts of a vehicle receiver system 100 according to an embodiment of the invention.
Figure 2:
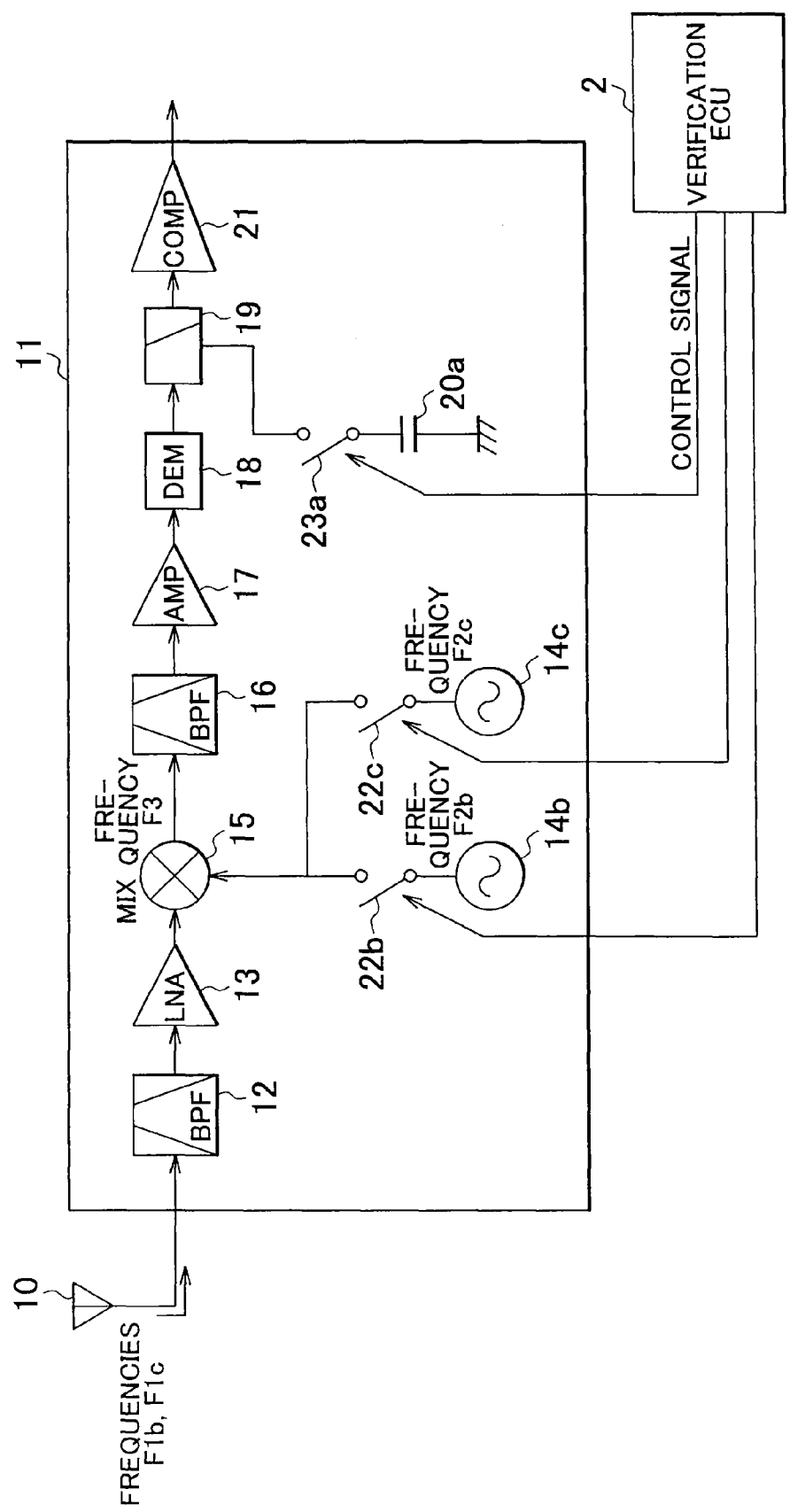
FIG. 2 is a block diagram showing an example of a configuration of a receiver 1.

FIG. 1 is a block diagram showing the main parts of a vehicle receiver system 100 according to an embodiment of the invention, and FIG. 2 is a block diagram showing an example of a configuration of a receiver 1.

The receiver system 100 includes the receiver 1, which is provided in a vehicle, and a verification ECU 2.

Various signals transmitted from respective devices are input into the receiver 1 via a reception antenna 10. The receiver 1 performs signal processing in a reception circuit 11 to output data stored in the various signals to the verification ECU 2. Further, in response to a control signal from the verification ECU 2, the receiver 1 is configured such that an operating mode thereof is switched between a key reception mode and a tire pressure reception mode, to be described below. The receiver 1 is connected to a power supply line and a ground (GND) line. A voltage +B is applied to the power supply line via the verification ECU 2, and the receiver 1 operates on the basis of the voltage +B applied via the power supply line. Note, however, that the receiver 1 may be connected to the power supply line and the GND line directly rather than via the verification ECU 2. An example of a specific configuration of the receiver 1 will be described below with reference to FIG. 2.

The verification ECU 2 includes a microcomputer 2a and interfaces (I/Fs) 2b to 2e. Note that the functions of the verification ECU 2 may be realized through cooperation between a plurality of ECUs. Further, all or a part of the functions of the verification ECU 2 may be built into the receiver 1.

A key detection emitter 3 that forms a detection region in a vehicle cabin is connected to the verification ECU 2. The detection region is a region in which to detect a portable key 6 that may exist in the vehicle cabin. The key detection emitter 3 forms the detection region by emitting a request signal via a key detection antenna (not shown).

Further, a door courtesy switch 4 and a wheel speed sensor 5 are connected to the verification ECU 2.

The door courtesy switch 4 may be provided for each door of the vehicle. Output signals from the respective door courtesy switches 4 are supplied to the verification ECU 2. The door courtesy switch 4 turns ON when the door is opened and OFF when the door is closed. Note, however, that in another embodiment, the door courtesy switch 4 may turn OFF when the door is opened and ON when the door is closed.

The wheel speed sensor 5 may be provided for each wheel of the vehicle. Output signals from the respective wheel speed sensors 5 are supplied to the verification ECU 2. The wheel speed sensor 5 may employ a semiconductor system, for example, in order to output a vehicle speed signal (a vehicle speed pulse) corresponding to a vehicle speed to the verification ECU 2.

The portable key 6 includes a transceiver (a transponder), a transmission/reception antenna, and an inbuilt memory that stores a given valid verification code (an ID code). The transceiver of the portable key 6 performs two-way communication with a vehicle side transceiver (the receiver 1 and the key detection emitter 3) using weak radio waves. Note that the portable key 6 includes a switch (a button) that is operated by a user. The portable key 6 may include a function for transmitting a wireless signal instructing locking/unlocking of the doors when the user operates the switch (in other words, a function of a normal keyless entry system), but need not include this function. Further, the portable key 6 may have an inbuilt mechanical key with which the user can perform operations to lock and unlock the doors of the vehicle, or may be independent of a mechanical key.

Upon reception of a request signal transmitted from the key detection emitter 3, the portable key 6 transmits a response signal corresponding to the request signal. The response signal includes a verification code. A code indicating that the response signal is in response to the request signal from the key detection emitter 3 may also be incorporated into the response signal. A wireless signal transmitted by the portable key 6 is input into the receiver 1 as an input signal. A frequency of the input signal takes a predetermined value F1b (314.35 MHz, for example).

A tire valve transmitter 7 includes a sensing unit that detects a tire air pressure. Further, the tire valve transmitter 7 generates a signal indicating a detection result obtained by the sensing unit and transmits the generated signal to the receiver 1. A wireless signal transmitted by the tire valve transmitter 7 is input into the receiver 1 as an input signal. A frequency of the input signal takes a predetermined value F1c (315 MHz, for example). The predetermined value F1c may be a different value to the predetermined value F1b. The tire valve transmitter 7 may be provided for each wheel. More specifically, for example, in order to detect the tire air pressure, the tire valve transmitter 7 may be fixed to a rim portion of each wheel and the sensing unit may be disposed inside a tire. A transmission timing of the wireless signal from the tire valve transmitter 7 may be set as desired. For example, the transmission timing may be internally determined by the tire valve transmitter 7. For example, the tire valve transmitter 7 may transmit a wireless signal relating to the tire air pressure at predetermined period intervals, regardless of (i.e. not in synchronization with) an operation of the receiver 1. Note that the predetermined period may be fixed or set to vary randomly or in accordance with a certain regulation.

Next, the configuration of the receiver 1 will be described with reference to FIG. 2. As shown in FIG. 2, the receiver 1 includes the reception antenna 10 that receives input signals at the frequencies F1b, F1c, and the reception circuit 11 that performs signal processing on the input signals input by the reception antenna 10.

The reception circuit 11 includes a band pass filter (BPF) 12, a low noise amplifier (LNA) 13, local signal generators 14b to 14c, a mixer 15, a band pass filter (BPF) 16, an amplifier (AMP) 17, a demodulator 18, a waveform shaping circuit 19, a capacitor 20a, and a comparator 21.

The BPF 12 receives an input signal and performs band limitation by extracting only a predetermined band of frequencies from the input signal. The LNA 13 amplifies the band-limited signal. The local signal generators 14b, 14c generate signals having fixed frequencies F2b, F2c in order to convert the amplified signals having the desired frequencies F1b, F1c into signals having an intermediate frequency F3. For example, the local signal generator 14b generates a signal having a fixed frequency F2a (303.65 MHz, for example) that differs in frequency from the frequency F1b by the intermediate frequency F3, while the local signal generator 14c generates a signal having a fixed frequency F2a (304.3 MHz, for example) that differs in frequency from the frequency F1c by the intermediate frequency F3. The mixer 15 determines a difference between the amplified signals having the desired frequencies F1b, F1c and the signals having the fixed frequencies F2b, F2c, generated by the local signal generators 14b, 14c, to generate a signal having the intermediate frequency F3. The BPF 16 further limits the band of the signal having the intermediate frequency F3, output by the mixer 15.

The amplifier 17 amplifies the signal having the intermediate frequency F3 that has been passed through the BPF 16. The demodulator 18 generates demodulation data by demodulating the signal that has been passed through the BPF 16. The waveform shaping circuit 19 performs waveform shaping on the basis of the demodulation data demodulated by the demodulator 18. The capacitor 20a is used to adjust a filter constant employed in the waveform shaping circuit 19, and is set at a predetermined capacitance value. The comparator 21 converts an analog waveform generated by the waveform shaping circuit 19 into a digital waveform.

Further, the reception circuit 11 includes switches 22b to 22c, and a switch 23a for performing a switch to connect the capacitor 20a to the waveform shaping circuit 19. The switches 22b, 22c is switched to select a signal to be transmitted to the mixer 15 between an output of the local signal generator 14b and an output of the local signal generator 14c. The switch 23a is switched to connect and disconnect the capacitor 20a to and from the waveform shaping circuit 19.

One of the switches 22b, 22c is turned ON on the basis of a control signal from the verification ECU 2. As a result, a signal that differs in frequency from the frequency of the input signal from either the portable key 6 or the tire valve transmitter 7, depending on which thereof has been input into the receiver 1, by the intermediate frequency F3 is input into the mixer 15.

The switch 23a is ON/OFF controlled on the basis of a control signal from the verification ECU 2. The filter constant of the waveform shaping circuit 19 is set at an optimum filter constant for a single type of input signal (in this example, the input signal from the tire valve transmitter 7), or in other words a filter constant corresponding to a data speed stored in the input signal. Therefore, to ensure that an optimum filter constant is applied likewise when the other input signal is input, the filter constant is modified by turning the switch 23a ON so that the capacitor 20a is connected to the waveform shaping circuit 19.

Note that in the configuration shown in FIG. 2, a single local signal generator and a phase locked loop (PLL) circuit may be used instead of the local signal generators 14b, 14c. In this case, the PLL circuit switches the frequency of the signal having a predetermined frequency generated by the local signal generator. The PLL circuit may be configured to perform the frequency switch on the basis of a control signal from the verification ECU 2.

Figures 3, 4:
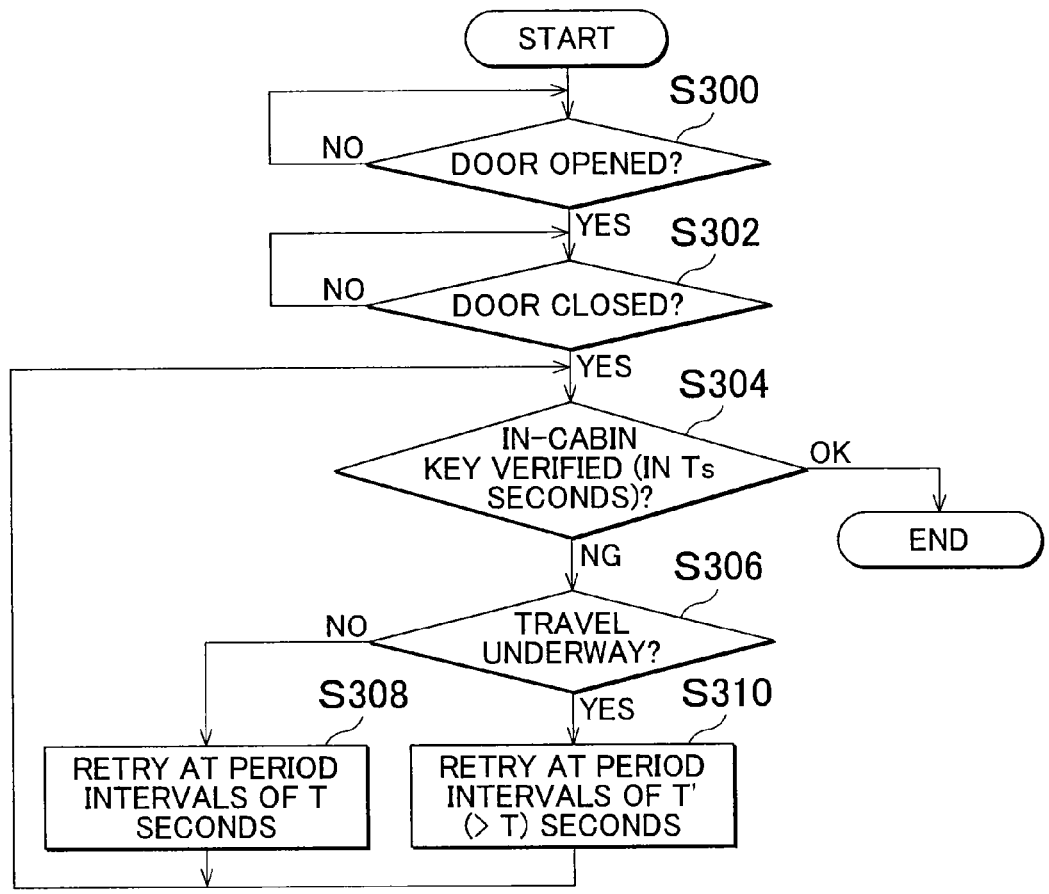
FIG. 3 is a flowchart showing an example of main processing executed by a verification electronic control unit (ECU) 2.
FIG. 4 is a table on which various times (a retry period and the like) are arranged.

FIG. 3 is a flowchart showing an example of main processing executed by the verification ECU 2. A processing routine shown in FIG. 3 may be executed when an ignition switch is in a ON state, for example. FIG. 4 is a table relating to FIG. 3, on which various times (a retry period to be described below and so on) are arranged.

In Step 300, a determination is made on the basis of a condition of the door courtesy switch 4 as to whether or not a door has been opened. Note that all of the doors, including back doors, or a specific door may be subjected to the determination. When it is determined that a door has been opened, the routine advances to Step 302. In other words, when an operation to open one of the determination subject doors is detected, the routine advances to Step 302.

In Step 302, a determination is made on the basis of the condition of the door courtesy switch 4 as to whether or not the door in relation to which the opening operation was detected in Step 300 has been closed. When an operation to close the door in relation to which the opening operation was detected in Step 300 is detected, or in other words when an operation to open and then close one of the determination subject doors is detected, the routine advances to Step 304.

In Step 304, in-cabin key verification processing is executed.

Specifically, the verification ECU 2 switches the operating mode of the receiver 1 to a key reception mode. The key reception mode is a mode in which processing is performed by the receiver 1 to receive the response signal from the portable key 6. In the example shown in FIG. 2, the verification ECU 2 turns the switch 22b ON and turns the switch 23a ON. As a result, the signal having the frequency F1b generated by the local signal generator 14b is input into the mixer 15, and the filter constant of the waveform shaping circuit 19 is set at the optimum filter constant for the input signal input from the portable key 6.

Further, the verification ECU 2 transmits a request signal to the vehicle cabin interior via the key detection emitter 3. When the portable key 6 exists within the vehicle cabin at this time, the portable key 6 transmits a response signal in response to the request signal. The response signal is received by the receiver 1. When the portable key 6 does not exist in the vehicle cabin, on the other hand, the portable key 6 does not respond to the request signal. Accordingly, the receiver 1 does not receive a response signal from the portable key 6. When the receiver 1 receives the response signal from the portable key 6, the verification code included in the response signal is demodulated, whereupon the verification code included in the response signal is supplied to the verification ECU 2.

Upon reception of the verification code included in the response signal, the verification ECU 2 compares the verification code included in the response signal with a verification code stored in a predetermined memory (not shown). When the respective verification codes match, it is determined that key verification has been successful (OK) (i.e. that the correct portable key 6 exists in the vehicle cabin), and therefore the operating mode of the receiver 1 is switched to a tire pressure reception mode, whereupon the processing is terminated. The tire pressure reception mode is a mode in which processing is performed by the receiver 1 to receive a signal from the tire valve transmitter 7. In the example shown in FIG. 2, the verification ECU 2 turns the switch 22c ON and turns the switch 23a OFF. As a result, the signal having the frequency F1c generated by the local signal generator 14c is input into the mixer 15, and the filter constant of the waveform shaping circuit 19 is set at the optimum filter constant for the input signal input from the tire valve transmitter 7.

When, on the other hand, the receiver 1 does not receive the response signal from the portable key 6, or when the receiver 1 receives the response signal from the portable key 6 but the verification codes do not match, it is determined that key verification has failed (NG), and therefore the operating mode of the receiver 1 is switched to the tire pressure reception mode, whereupon the routine advances to Step 306. Note that at this time, it may be determined that the portable key 6 is likely to have been taken out of the vehicle, and accordingly, the verification ECU 2 may output a predetermined warning (or continue to output the warning if the warning has already been output).

Hence, when the verification ECU 2 performs the in-cabin key verification processing of Step 304, the operating mode of the receiver 1 is switched to the key reception mode. A duration of an operation of the receiver 1 in the key reception mode may be set at a predetermined time Ts (seconds). In other words, the verification ECU 2 switches the operating mode of the receiver 1 from the tire pressure reception mode to the key reception mode to perform the in-cabin key verification processing, and then switches the operating mode of the receiver 1 back to the tire pressure reception mode once the predetermined time Ts has elapsed. The predetermined time Ts may correspond to an amount of time required for the in-cabin key verification processing. Accordingly, the verification ECU 2 switches the operating mode of the receiver 1 back to the tire pressure reception mode both when the receiver 1 receives the response signal from the portable key 6 after the operating mode of the receiver 1 is switched from the tire pressure reception mode to the key reception mode to perform the in-cabin key verification processing and before the predetermined time Is has elapsed, and when the receiver 1 receives the response signal from the portable key 6 after the operating mode of the receiver 1 is switched from the tire pressure reception mode to the key reception mode and before the predetermined time Ts elapses, but the verification codes do not match. Hence, the predetermined time Ts corresponds to the duration of an operation performed by the receiver 1 in the key reception mode, and will therefore be referred to hereafter as a key reception mode operation time.

In Step 306, a determination is made on the basis of a detection signal from the wheel speed sensor 5 as to whether or not the vehicle is traveling. Note that the determination as to whether or not the vehicle is traveling may be made using information from another sensor (an output rotation speed of a transmission from an output shaft rotation speed sensor or the like) instead of or in addition to information from the wheel speed sensor 5. When the vehicle is traveling, the routine advances to Step 310. When the vehicle is not traveling, on the other hand, or in other words when the vehicle is stopped, the routine advances to Step 308.

In Step 308, a retry period of the in-cabin key verification processing is set at a predetermined time T (seconds) for use during a vehicle stoppage (see FIG. 4). Hence, when the vehicle is stopped, the in-cabin key verification processing of Step 304 is executed at intervals of the predetermined time T until key verification is successful. The retry period T for use during a vehicle stoppage is set to be longer than the key reception mode operation time Ts (for example, T=3 seconds). In other words, T>Ts. During a vehicle stoppage, therefore, the duration of an operation performed by the receiver 1 in the tire pressure reception mode (also referred to hereafter as a "tire pressure reception mode operation time") per period corresponds to a time obtained by subtracting Ts from the retry period T (=T−Ts) (see FIG. 4).

In Step 310, the retry period of the in-cabin key verification processing is set at a predetermined time T' (seconds) for use during vehicle travel (see FIG. 4). Hence, when the vehicle is traveling, the in-cabin key verification processing of Step 304 is executed at intervals of the predetermined time T' until key verification is successful. The retry period T' for use during vehicle travel is set to be longer than the retry period T for use during a vehicle stoppage (for example, T'=4 seconds). In other words, T'>T.

During vehicle travel, therefore, the tire pressure reception mode operation time per period corresponds to a time obtained by subtracting Ts from the retry period T' (=T'−Ts) (see FIG. 4), which is longer than the tire pressure reception mode operation time during a vehicle stoppage. In other words, the tire pressure reception mode operation time during vehicle travel is longer than the tire pressure reception mode operation time during a vehicle stoppage by a predetermined time (=T'−T).

Hence, in this embodiment, when key verification initially ends in failure (NG), the in-cabin key verification processing is executed continuously until key verification is successful (or until the ignition switch is switched OFF). At this time, the in-cabin key verification processing is executed at intervals of a retry period corresponding to either vehicle travel or a vehicle stoppage (the retry period T' during vehicle travel and the retry period T during a vehicle stoppage). Note that when the user (a driver, for example) is made aware that the portable key 6 has been taken out of the vehicle (by a front seat passenger, for example) by the warning issued in response to removal of the portable key 6 from the vehicle, the removed portable key 6 may be brought back into the vehicle. In this case, it is desirable that the warning be deactivated quickly. According to this embodiment, the in-cabin key verification processing is executed continuously when key verification fails, and therefore subsequent return of the portable key 6 to the vehicle by the user can be detected early. As a result, the warning can be deactivated quickly.

For the duration of the key reception mode operation time Ts, the receiver 1 operates in the key reception mode in order to perform the in-cabin key verification processing, as described above. In other words, even when the wireless signal relating to the tire air pressure is transmitted by the tire valve transmitter 7, the receiver 1 does not receive the wireless signal. Therefore, in a situation where the in-cabin key verification processing is executed continuously, a tire air pressure monitoring capability may deteriorate.

By increasing the length of the retry period in response to this problem, the required tire air pressure monitoring capability may be secured, but on the other hand, the period of the in-cabin key verification processing lengthens, and as a result, a key removal monitoring capability may deteriorate.

In this embodiment, as described above, the retry period of the in-cabin key verification processing is set to be relatively short when the vehicle is stopped so that the required key removal monitoring capability is secured, and when the vehicle is traveling, the retry period of the in-cabin key verification processing is set to be relatively long, thereby lengthening the tire pressure reception mode operation time per period such that the required tire air pressure monitoring capability is secured.

The portable key 6 is more likely to be taken out of the vehicle when the vehicle is stopped than when the vehicle is traveling. Similarly, the portable key 6 is more likely to be brought back into (returned to) the vehicle when the vehicle is stopped than when the vehicle is traveling. Therefore, the need for the key removal monitoring capability is greater when the vehicle is stopped than when the vehicle is traveling. The need for the tire air pressure monitoring capability, on the other hand, is greater when the vehicle is traveling than when the vehicle is stopped. The reason for this is that a reduction in the tire air pressure is directly related to the travel performance of the vehicle. Hence, according to this embodiment, considering the fact that the need for the tire air pressure monitoring capability and the key removal monitoring capability varies according to whether the vehicle is traveling or stopped, a ratio between the tire pressure reception mode operation time and the key reception mode operation time per period is varied depending on whether the vehicle is traveling or stopped. More specifically, the tire pressure reception mode operation time per period when the vehicle is travelling is set to be greater when than the tire pressure reception mode operation time per period when the vehicle is stopped. In so doing, the tire air pressure monitoring capability and the key removal monitoring capability can both be realized appropriately.

An embodiment of the invention was described in detail above, but the invention is not limited to the above embodiment, and various amendments and substitutions may be applied to the above embodiment without departing from the scope of the invention.

For example, in the above embodiment, the tire pressure reception mode operation time per period is set to be longer when the vehicle is traveling than when the vehicle is stopped by setting the retry period to be longer when the vehicle is traveling than when the vehicle is stopped, assuming that the key reception mode operation time Is per period is fixed. However, various methods may be employed to set the tire pressure reception mode operation time per period to be longer when the vehicle is traveling than when the vehicle is stopped. For example, in a configuration where the key reception mode operation time Ts per period can be shortened, the key reception mode operation time Ts may be shortened when the vehicle is traveling while keeping the retry period constant. Further, in the above embodiment, the in-cabin key verification processing is executed continuously at intervals of the fixed retry period T' when the vehicle is traveling and executed continuously at intervals of the fixed retry period T when the vehicle is stopped. However, the respective retry periods T', T do not necessarily have to be fixed. For example, during vehicle travel, the in-cabin key verification processing may be executed continuously by using not only the retry period T' but also the retry period T. When, for example, a wireless signal relating to the tire air pressure is not received from the tire valve transmitter 7 even after the elapse of a predetermined time following a previous reception time, the retry period T' may be used during vehicle travel. At this time, the retry period T' itself may be modified so as to lengthen as the time following reception of the previous wireless signal relating to the tire air pressure increases. Alternatively, the retry period T may be used from a point at which the vehicle is shifted from a vehicle stopped state to a vehicle travel state to the elapse of a predetermined time, and the retry period T' may be used during vehicle travel following the elapse of the predetermined time. This configuration takes into account that fact that when key verification fails (NG) a fixed number of times following the start of vehicle travel, the likelihood that the portable key 6 has been taken out of the vehicle is extremely high and the likelihood that the portable key 6 will be brought back into the vehicle as the vehicle continues to travel thereafter is low. Hence, there exists a wide variety of configurations in which the proportion of the tire pressure reception mode operation time is set to be longer during vehicle travel than during a vehicle stoppage. The proportion of the tire pressure reception mode operation time may include the tire pressure reception mode operation time per period or fixed time period (i.e., a predetermined period of time), a proportion of the tire pressure reception mode operation time to a predetermined period of time, and a ratio of the tire pressure reception mode operation time to the key reception mode operation time per a predetermined period of time.

Further, in the above embodiment, the proportion of the tire pressure reception mode operation time is varied depending on whether the vehicle is traveling or stopped, but the proportion of the tire pressure reception mode operation time may be varied between a case in which a vehicle speed equals or exceeds a predetermined value and a case in Which the vehicle speed is lower than the predetermined value, and in this case, the predetermined value need not be 0 (i.e. corresponding to a vehicle stoppage). For example, the retry period T' may be used when the vehicle speed equals or exceeds the predetermined value, and the retry period T may be used when the vehicle speed is lower than the predetermined value. The predetermined value may be a value (50 km/h) corresponding to regulations relating to tire pressure monitoring, for example, or a value (a value no greater than 10 km/h or 5 km/h, for example) having a margin relative to the value corresponding to regulations.

Furthermore, in the above embodiment, the two retry periods T, T' are used separately in accordance with the vehicle speed, but three or more retry periods may be set in accordance with the vehicle speed. For example, three retry periods that increase in steps as the vehicle speed increases may be used.

Moreover, in the above embodiment, the processing of Step 304 onward in FIG. 3 is executed when the door is opened and closed, but the processing of Step 304 onward in FIG. 3 may be executed when another condition is established (for example, when a situation where the portable key 6 may be moved into or out of the vehicle is detected). In other words, the processing of Step 304 in FIG. 3 may be executed at any desired timing. For example, the processing of Step 304 in FIG. 3 may be executed periodically (at predetermined time intervals or predetermined travel distance intervals, for example), when a shift from the vehicle traveling condition to the vehicle stopped state is detected, when an open window or a window opening operation is detected in the vehicle stopped state, or when a low speed traveling state is established in the vehicle continuously or cumulatively for at least a predetermined time.

Further, in the above embodiment, the tire valve transmitter 7 and the receiver 1 communicate in only one direction, i.e. from the tire valve transmitter 7 to the receiver 1, and the tire valve transmitter 7 transmits the wireless signal relating to the tire air pressure non-synchronously with the operation of the receiver 1. With this configuration, the receiver 1 cannot predict a transmission timing of the wireless signal relating to the tire air pressure, and it is therefore effective to increase the proportion of the tire pressure reception mode operation time during vehicle travel, as described above. However, the invention may also be applied to a configuration in which the two-way communication is performed between the tire valve transmitter 7 and the receiver 1. With this configuration, the tire valve transmitter 7 transmits the wireless signal relating to the tire air pressure in response to a request (trigger) signal from the receiver 1. In this case, a reception probability of the wireless signal relating to the tire air pressure in the receiver 1 may be increased by modifying the transmission timing of the request (trigger) signal in accordance with the retry period T or T'.

Furthermore, in the above embodiment, the frequency of the wireless signal transmitted by the portable key 6 is set at a different frequency to the frequency of the wireless signal transmitted by the tire valve transmitter 7, but these frequencies may be set to be identical. Likewise in this case, by ensuring that the reception processing of the receiver 1 is performed appropriately, two different signals can be subjected to reception processing by the single receiver 1. For example, by setting a number of frames of the signal transmitted by the portable key 6 to be larger, the signal of the portable key 6 can be extracted in the receiver 1 even in a case where the wireless signal transmitted by the portable key 6 and the wireless signal transmitted by the tire valve transmitter 7 are received by the receiver 1 together.

Moreover, in the above embodiment, the retry period is set on the basis of the vehicle speed at an end point of the processing of Step 304 in FIG. 3. However, the vehicle speed for which to set the retry period may be determined at any desired timing. For example, the retry period may be set on the basis of an average vehicle speed within a predetermined time prior to a time at which the retry period is set. When the average vehicle speed equals or exceeds a predetermined vehicle speed, for example, the retry period T' may be set as the retry period, and when the average vehicle speed is lower than the predetermined vehicle speed, the retry period T may be set as the retry period. Further, the retry period may be set at an arbitrary timing. For example, the vehicle speed may be determined following the elapse of the retry period T from a start point of the processing of Step 304 in FIG. 3 such that when the vehicle is traveling at that time, the processing of Step 304 of a following period is performed immediately, whereas when the vehicle is stopped, the processing of Step 304 of the following period is performed after (T'−T) seconds from that point.

In the above embodiment, the receiver 1 functions as the receiver and the receiving unit according to the aspects of the invention, and the verification ECU 2 functions as the switching control unit as well as the key verification device according to the aspects of the invention.

What is claimed is:

1. A vehicle receiver system comprising:
    a receiver that is provided in a vehicle cabin, wherein an operating mode of the receiver includes a first mode in which processing is performed to receive a first wireless signal for key verification, transmitted from a portable key, and a second mode in which processing is performed to receive a second wireless signal relating to a tire air pressure, transmitted from a transmitter provided on a tire; and
    a key verification device that performs a key verification on the portable key in the vehicle cabin on the basis of the first wireless signal received by the receiver, wherein:
    in a predetermined situation where the key verification device performs the key verification continuously, the receiver is configured such that the operating mode of the receiver is alternated between the first mode and the second mode; and
    in the predetermined situation, a proportion of a second mode operation time in which the receiver operates in the second mode is set to be greater when a vehicle speed is relatively high than when the vehicle speed is relatively low.

2. The vehicle receiver system according to claim 1, wherein
    in the predetermined situation, the receiver is configured to operate in the first mode at intervals of a predetermined period.

3. The vehicle receiver system according to claim 2, wherein
    the predetermined period set when the vehicle speed is relatively high is longer than the predetermined period set when the vehicle speed is relatively low.

4. The vehicle receiver system according to claim 1, wherein:
    the second mode operation time extends from a point at which the operating mode of the receiver is switched to the second mode to a point at which the operating mode is switched to the first mode; and
    the second mode operation time set when the vehicle speed is relatively high is longer than the second mode operation time set when the vehicle speed is relatively low.

5. The vehicle receiver system according to claim 1, wherein
    a frequency of the first wireless signal differs from a frequency of the second wireless signal.

6. The vehicle receiver system according to claim 1, wherein
    in the predetermined situation, the proportion of the second mode operation time is set to be greater when the vehicle speed equals or exceeds a predetermined value than when the vehicle speed is lower than the predetermined value.

7. The vehicle receiver system according to claim 1, wherein
    in the predetermined situation, the proportion of the second mode operation time is set to be greater when the vehicle is traveling than when the vehicle is stopped.

8. The vehicle receiver system according to claim 1, wherein:
    the key verification device performs an initial verification at a predetermined timing; and
    the predetermined situation is a situation where the initial key verification by the key verification device has ended in failure.

9. A vehicle receiver provided in a vehicle cabin comprising:
    a receiving unit having a plurality of operating modes including a first mode in which processing is performed to receive a first wireless signal for key verification, transmitted from a portable key, and a second mode in which processing is performed to receive a second wireless signal relating to a tire air pressure, transmitted from a transmitter provided on a tire; and
    a switching control unit that alternates the operating mode of the receiving unit between the first mode and the second mode in a predetermined situation where key verification on the basis of the first wireless signal is performed continuously, wherein
    in the predetermined situation, a proportion of a second mode operation time in which the receiving unit operates in the second mode is set to be greater when a vehicle speed is relatively high than when the vehicle speed is relatively low.

10. An operating method for a vehicle receiver provided in a vehicle cabin comprising:
    when the receiver is operated in a first mode, performing processing to receive a first wireless signal for key verification, transmitted from a portable key;
    when the receiver is operated in a second mode, performing processing to receive a second wireless signal relating to a tire air pressure, transmitted from a transmitter provided on a tire; and
    in a predetermined situation where key verification on the basis of the first wireless signal is performed continuously, alternating an operating mode of the receiver between the first mode and the second mode, wherein
    in the predetermined situation, a proportion of a second mode operation time in which the receiver operates in the second mode is set to be greater when a vehicle speed is relatively high than when the vehicle speed is relatively low.

* * * * *